Sept. 29, 1931.     A. M. NIVEN     1,825,412
SLEEVE VALVE ACTUATING MECHANISM
Filed April 15, 1927
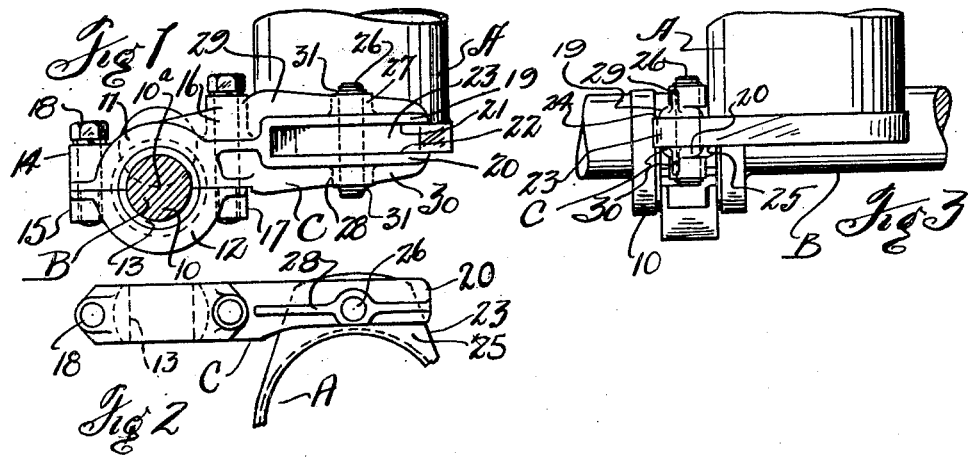
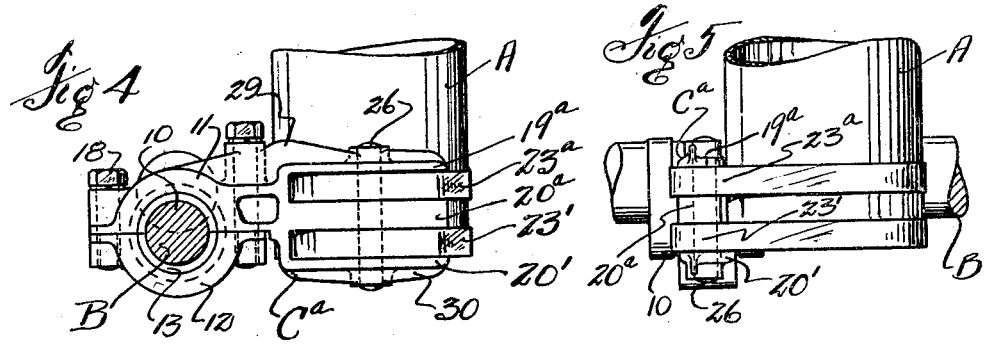
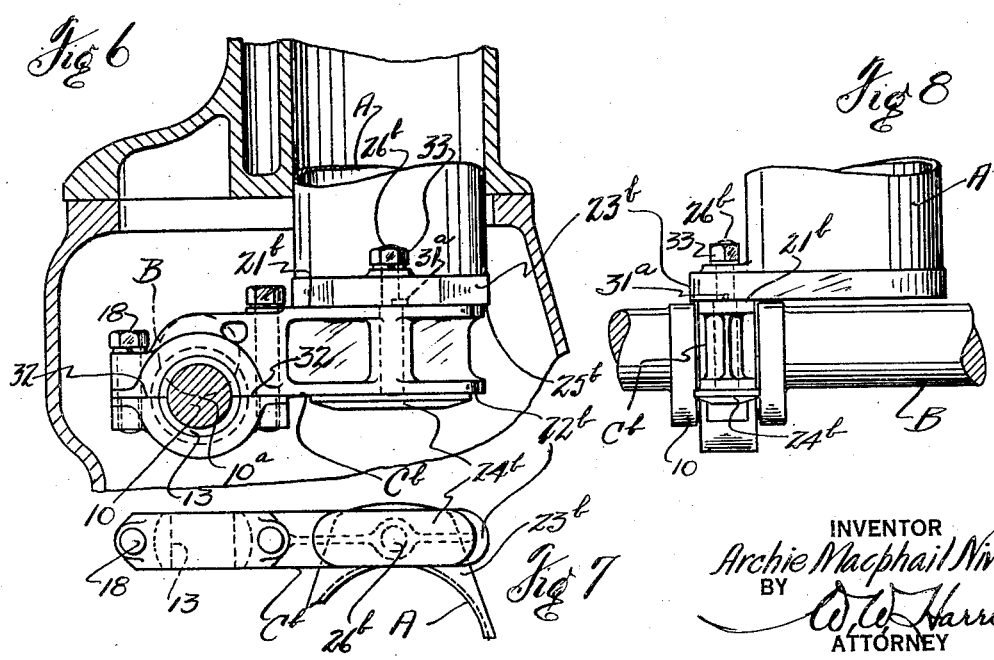
INVENTOR
Archie Macphail Niven
BY
W. W. Harris
ATTORNEY Patented Sept. 29, 1931

1,825,412

UNITED STATES PATENT OFFICE

ARCHIE MACPHAIL NIVEN, OF DETROIT, MICHIGAN, ASSIGNOR TO CONTINENTAL MOTORS CORPORATION, OF DETROIT, MICHIGAN, A CORPORATION OF VIRGINIA

SLEEVE VALVE ACTUATING MECHANISM

Application filed April 15, 1927. Serial No. 183,969.

This invention relates to internal combustion engines and refers more particularly to an improved sleeve valve driving mechanism.

My invention has particular reference to single sleeve valve engines in which the sleeve valve associated with each cylinder is given a combined oscillating and reciprocating movement with respect to the cylinder axis in controlling the intake and exhaust in a manner well known at the present time.

I have provided a sleeve drive mechanism which is of simple construction capable of manufacture at relative low cost, and is of a strong and durable character. My invention provides a sleeve drive which serves to locate the sleeve valve layshaft closely to the engine crankshaft whereby the driving distance between these parts is made relatively short. A further feature of my invention resides in providing a sleeve driving link having a sleeve bearing face in a common plane with a face of the link layshaft bearing whereby machining of these parts is facilitated.

Other features of my invention reside in the combinations and arrangements of parts hereinafter described and claimed.

Referring to the drawings in which like reference characters indicate corresponding parts throughout the several views, Fig. 1 represents an elevation view of my sleeve valve driving mechanism, Fig. 2 is a plan view thereof, Fig. 3 is an elevation view at right angles with Fig. 1, Fig. 4 is an elevation view of a modified construction, Fig. 5 is an elevation view at right angles with Fig. 4, Fig. 6 is an elevation view of a further modification, Fig. 7 is a plan view thereof, and Fig. 8 is an elevation view of the form shown in Fig. 6 and at right angles thereto.

In the drawings reference character A represents the sleeve valve having the usual or other preferred form and arrangement of ports (not shown) for controlling the intake and exhaust such as illustrated in my copending application Serial No. 169,742 filed February 21, 1927. For imparting the combined reciprocating and oscillating movement to the single sleeve valves for each cylinder, it is customary to provide a valve layshaft B which may be driven from the crankshaft and at a predetermined speed relative to the crankshaft according to the engine cycle as will be readily understood The layshaft B is formed with longitudinally spaced cranks 10 at each cylinder of the engine for imparting the drive to the sleeve valve.

Between the crank 10 and sleeve valve A I provide a sleeve driving link C which as shown in Figs. 1, 2, and 3 may be formed at one end with the hemispherical bearing socket portion 11 cooperating with hemispherical bearing sockets 12. Within the socket portion and cap is located a spherical ball 13 either mounted on the crank 10 in which instance it is divided for purposes of assembly or integrally formed therewith. For holding the socket portion and cap in position about the crank and spherical ball, cooperating pairs of lugs 14, 15 and 16, 17 are provided on the link C and cap 12 respectively, the lugs of the link and cap being located on opposite sides of the ball and socket structure and bored to receive the screw bolts 18 which pass through the cooperating pairs of lugs with the axes of the fasteners 18 perpendicular with the layshaft axis. The link C may be forked at 19 and 20 to provide parallel spaced bearing faces 21 and 22 respectively. The sleeve A is provided with the lateral projection 23 fitting between the forks 19 and 20 and having spaced parallel bearing faces 24 and 25 respectively bearing against faces 21 and 22. A pivot pin 26 passes through link bosses 27, 28 and sleeve projection 23 serving to permit oscillation of the sleeve valve with respect to the link. For strengthening purposes the link may be provided with oppositely extending flanges 29, 30. For preventing accidental displacement of the pivot pin 26 I have provided the spring split circlips 31 on the ends of the pin 26, these circlips being engageable in circumferential grooves in the pin 26.

As the layshaft is rotated the crank 10 causes the link to move the sleeve in a combined reciprocating and oscillating movement, a point on the sleeve tracing the usual closed figure on the cylinder. The pin 26 will permit oscillation of the sleeve as the link moves parallel to itself, the ball and socket permitting the slight lateral swinging movement of the link due to oscillation of the sleeve valve.

In Figs. 4 and 5, instead of providing the link with a pair of forks and the sleeve valve with a single projection. I have shown a practical arrangement of parts for increasing the bearing surface between the sleeve and link, at the same time providing a relatively light and strong construction. In these figures the link $C^a$ is formed with three forks $19^a$, $20^a$ and $20'$, adjacent forks having bearing faces for the sleeve projections $23^a$, $21'$. The total bearing area between the link and sleeve valve is relatively great in this modified form of my invention. The general construction and operation otherwise corresponds with that described in connection with Figs. 1, 2 and 3.

In Figs. 6, 7, and 8 I have shown a still further form of my invention in which the link $C^b$ is, not forked but is formed with parallel bearing faces $21^b$, $22^b$, the link for lightness and strength being channel shaped. The sleeve projection $23^b$ is formed with a single bearing face $25^b$ cooperating with the link bearing face $21^b$. In this instance the substantially inverted T-shaped element or pivot pin $26^b$ carries a bearing member $24^b$ either integral with pin $26^b$ or connected thereto in any suitable manner, the member $24^b$ having a bearing face engaging the face $22^b$ of the link, the bearing $24^b$ extending parallel with the bearing $25^b$. For maintaining the position of the bearing $24^b$ a dowel pin $31^a$ is provided serving to prevent turning of the pin $26^b$ with respect to the sleeve projection $23^b$. A nut 33 threadedly engages the pin $26^b$ serving to hold the pin and bearing member $24^b$ in proper relation with respect to the link. In these views I have formed the link bearing face $22^b$ in the plane of the bearing faces 32 of the link socket portion whereby these faces may be machined in one operation, an important feature particularly from a standpoint of manufacture.

In Figs. 1, 2 and 3 the crank pin center $10^a$ is located below the sleeve projection 23 and below the lower end of the sleeve valve serving to position the layshaft as low in the crankcase as possible consistent with avoiding interference with the usual connecting rod. Thus the driving means between the layshaft and connecting rod is shortened due to the relatively close positioning of the layshaft and crankshaft axes. Furthermore a more compact arrangement of sleeve driving parts is provided permitting a compact sleeve drive crankcase housing capable of being located relatively near the sleeve valve as compared with prior constructions of this general character. In Figs. 6, 7, and 8 the construction permits the axis of the crank pin to be positioned even further below the sleeve valve bottom point.

Various modifications will suggest themselves from the disclosures of my invention and I do not limit the scope of my invention to the specific arrangement shown and described except as claimed hereinafter.

What I claim as my invention is:

1. Sleeve valve driving mechanism for internal combustion engines comprising in combination a sleeve valve, and mechanism for imparting combined reciprocating and oscillating movement to said sleeve valve, said mechanism consisting of a layshaft and a link connecting the layshaft and sleeve, said sleeve having a bearing surface substantially transverse to the sleeve axis, said link having spaced parallel bearing surfaces one of which engages the said sleeve bearing surface, means pivotally connecting the said link and sleeve, and means provided with a bearing surface engaging the other of said link bearing surfaces and carried by the said pivotal connecting means.

2. A sleeve valve internal combustion engine comprising in combination a valve layshaft, a sleeve valve, means transmitting movement from the layshaft to the sleeve whereby the sleeve is moved in a combined reciprocating and oscillating path with respect to the sleeve axis, said means including a member bearing on said movement transmitting means, and means connecting said member with the sleeve valve.

3. A sleeve valve internal combustion engine comprising in combination a valve layshaft, a sleeve valve, means transmitting movement from the layshaft to the sleeve whereby the sleeve is moved in a combined reciprocating and oscillating path with respect to the sleeve axis, said means including a member bearing on said movement transmitting means, and means pivotally connecting the first said means with the sleeve and also maintaining the bearing member in proper relation with respect to the sleeve.

4. A sleeve valve internal combustion engine comprising in combination, a layshaft provided with a crank, a sleeve valve, a link having a ball and socket connection at one end thereof with the crank, said link being provided with spaced substantially parallel bearings at the other end thereof, said sleeve having a bearing integral therewith engaging one of said link bearings, a bearing member separate from the sleeve engaging the other of said link bearings, and means connecting the bearing member and link with the sleeve whereby the layshaft will drive the sleeve in a combined reciprocating and oscillating movement.

5. Sleeve valve driving mechanism comprising in combination a sleeve valve, a layshaft, a link connected at one end thereof with the layshaft, a pin pivotally connecting the sleeve and link, said pin having a laterally extending portion providing a bearing for the link and means preventing turning of the pin and said bearing portion thereof about its axis as the sleeve is moved in a combined reciprocating and oscillating path.

6. Sleeve valve driving mechanism comprising in combination, a layshaft having a crank, a sleeve valve, a link formed with a bearing portion surrounding a portion of the crank, a cap surrounding the remaining portion of the crank, said link bearing portion and cap having engaged bearing faces spaced on opposite sides of the crank, said link having a bearing face for driving the sleeve, said bearing faces of the link bearing portion lying in a plane common to the said link sleeve driving bearing face.

7. Sleeve valve driving mechanism comprising in combination a layshaft, a sleeve valve, means connecting the layshaft and sleeve valve to drive the sleeve from the layshaft in a combined reciprocating and oscillating path with respect to the sleeve axis, said means including a link formed with a sleeve driving bearing face and a bearing face adjacent said layshaft, said bearing face being located in a common plane.

8. A sleeve valve internal combustion engine comprising in combination a valve layshaft, a sleeve valve, means transmitting movement from the layshaft to the sleeve whereby the sleeve is moved in a combined reciprocating and oscillating path with respect to the sleeve axis, said means including an inverted T-shaped member bearing on said movement transmitting means and connecting said movement transmitting means with the sleeve valve.

9. Sleeve valve driving mechanism comprising in combination, a sleeve valve, a layshaft positioned to one side of the sleeve valve and having a driving crank, a link connecting the crank and sleeve valve for imparting to the sleeve valve a combined reciprocating and oscillating movement with respect to the axis of the sleeve valve, said link having an end portion surrounding the crank and formed with spaced bearing faces adjacent the crank, said link also formed with a third bearing face adapted to drive the sleeve valve, said spaced bearing faces and said third bearing face lying in a common plane substantially perpendicular with the sleeve valve axis.

10. Sleeve valve driving mechanism comprising in combination, a sleeve valve, a layshaft positioned to one side of the sleeve valve and having a driving crank, a link connecting the crank and sleeve valve for imparting to the sleeve valve a combined reciprocating and oscillating movement with respect to the axis of the sleeve valve, said link having an end portion surrounding the crank and formed with spaced bearing faces adjacent the crank, said link also formed with a third bearing face adapted to drive the sleeve valve, said spaced bearing faces and said third bearing face lying in a common plane substantially perpendicular with the sleeve valve axis, one of said spaced bearing faces being co-extensive with said third bearing face.

In witness whereof, I hereunto subscribe my name this 8th day of April, A. D. 1927.

ARCHIE MACPHAIL NIVEN.